(12) United States Patent
Mielke

(10) Patent No.: US 7,704,028 B2
(45) Date of Patent: Apr. 27, 2010

(54) BORE SERRATION FOR LOCKING THREADED INSERTS AGAINST ROTATION

(75) Inventor: Rainer Mielke, Oberursel (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 12/149,840

(22) Filed: May 8, 2008

(65) Prior Publication Data

US 2008/0279652 A1   Nov. 13, 2008

(30) Foreign Application Priority Data

May 8, 2007   (DE) .................. 10 2007 022 468

(51) Int. Cl.
*F16B 37/04* (2006.01)

(52) U.S. Cl. ...................... 411/180; 411/116

(58) Field of Classification Search ............ 411/180, 411/402, 111, 116, 144, 163, 177, 181, 188; 81/121.1, 124.4, 125

See application file for complete search history.

(56) References Cited

U.S. PATENT DOCUMENTS

| | | | |
|---|---|---|---|
| 2,490,594 A | * | 12/1949 | Madden ...................... 411/180 |
| 4,210,372 A | * | 7/1980 | McGee et al. ................ 384/584 |
| 6,017,177 A | * | 1/2000 | Lanham ....................... 411/410 |
| 2002/0021948 A1 | | 2/2002 | Stumpf et al. |

FOREIGN PATENT DOCUMENTS

| | | |
|---|---|---|
| CH | 4 77 633 | 8/1969 |
| DE | 87 03 981 U1 | 4/1987 |
| EP | 0 080 558 B1 | 6/1983 |
| EP | 1 134 439 A2 | 9/2001 |

* cited by examiner

*Primary Examiner*—Gary Estremsky
(74) *Attorney, Agent, or Firm*—Timothy J. Klima; Shuttleworth & Ingersoll, PLC

(57) ABSTRACT

A bore serration for locking externally serrated inserts (3) against rotation, with the external serration (4) comprising several teeth (5), and particularly for use with components made of hard, brittle materials, includes an arcuate serration (10) featuring arcuate recesses (7) produced by plunge or circumferential surface milling. Each of the recesses positively accommodates at least two teeth (5) of the outer serration (4) of the threaded insert (3). The arcuate serration can be produced with high dimensional accuracy without damaging the workpiece and with reduced wear of the tool, and ensures a long service-life of the threaded insert.

22 Claims, 1 Drawing Sheet

BORE SERRATION FOR LOCKING THREADED INSERTS AGAINST ROTATION

Figure 1:
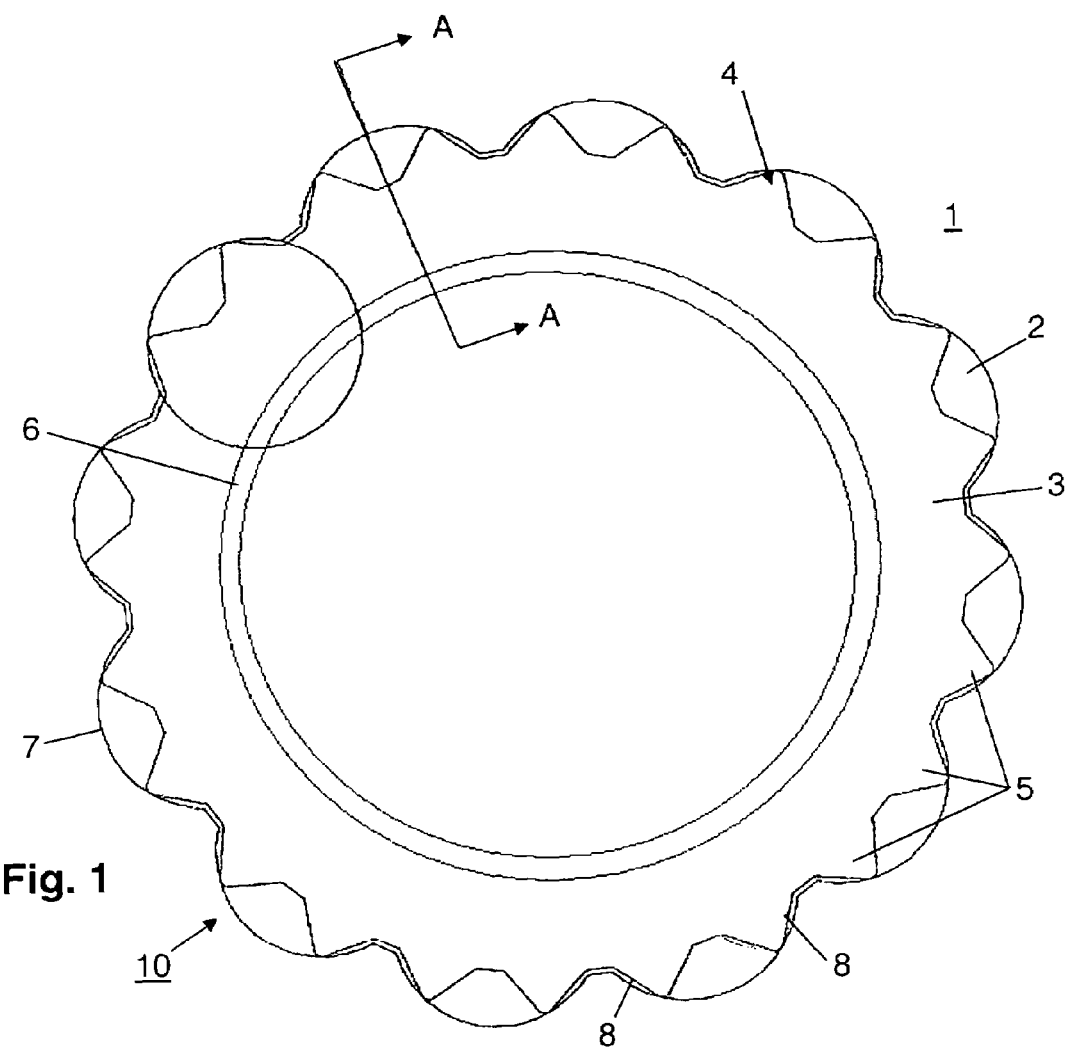

This application claims priority to German Patent Application DE102007022468.2 filed May 8, 2007, the entirety of which is incorporated by reference herein.

This invention relates to a bore serration for locking externally serrated threaded inserts against rotation, with the external serration comprising several teeth, and more particularly, for use with components made of hard, brittle materials.

It is generally known to provide threaded connections on a component, for example a casing, by use of a threaded insert retained in a bore. In the case of damage to the thread, the threaded insert can then simply be replaced, with the same thread size being applied again. In order to lock the threaded insert against rotation, an internal serration (a bore serration of star-type configuration to match and engage a conformal external serration of the threaded insert), is produced in the respective bore of the component by gradual penetration of a wobble (rotary) broaching tool. However, production of the bore serration is problematic with hard materials—such as Inconel 718 or titanium aluminide, as used, for example, in engine manufacture—in that surface damage and cracking may occur in the component and, moreover, the tool itself is stressed to such an extent that the serration is incomplete or, at least, its dimensional accuracy is not ensured, with the tool being subject to severe wear, so that it has to be replaced after only one application. When producing the bore serration by wobble (rotary) broaching, chipping may occur at the bottom end of the serrated bore. If a chip gets lodged in the thread, it must be removed with considerable effort, again with the hazard of crack formation. Production of the serration by special casting methods is also to be ruled out due to the crack-initiating effect of the casting structure and the resultant negative consequences on service-life.

The present invention, in a broad aspect, provides for completeness and dimensional accuracy of the bore serration produced in components made of hard, brittle materials to lock the threaded inserts against rotation, while avoiding damage to the workpiece and ensuring low wear of the tool.

The essence of the present invention is that the bore serration has arcuate recesses produced by plunge or circumferential surface milling, with each recess being positively engaged by at least two teeth of the threaded insert. The arcuate serration is also producible in hard, brittle materials, for example titanium aluminide as used in engine manufacture, with high dimensional accuracy and without damaging the workpiece and, compared to the known wobbling process, with low wear of the tool.

The arcuate serration can preferably be provided such that up to four teeth of the threaded insert engage one arcuate recess each. If the number of teeth is not an integral multiple of the recesses, at least one of the recesses can be widened or narrowed such that the number of teeth of the threaded insert, which positively engage the arcuate serration, is maximised. The bottom end of the arcuate recesses is provided with preferably radially arcuate runout.

The arcuate serration according to the present invention is advantageously applicable to components made of hard materials and high-temperature resistant alloys and to thin-walled threaded inserts as used in engine manufacture.

Figure 2:
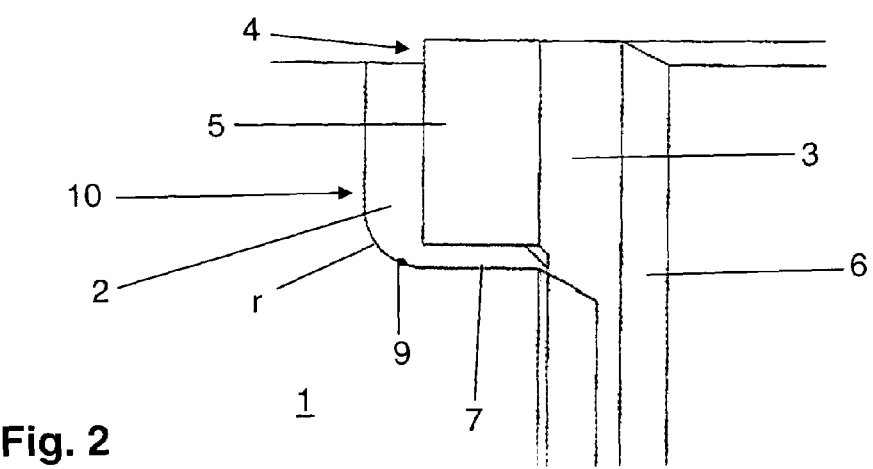

The present invention is more fully described in the light of the accompanying drawing showing a preferred embodiment. On the drawing, FIG. 1 is a horizontal section of a threaded insert arranged in a bore of a casing wall, and FIG. 2 is a sectional view along line A-A in FIG. 1.

A casing 1 made of titanium aluminide is provided with a bore 2 into which a standard threaded insert 3 is fitted. The threaded insert 3 has a serration 4 with an even number of teeth 5 on the outer circumference and an internal thread 6. In a partial area of the bore 2, arcuate recesses 7 are provided on the inner circumference which are dimensioned such that two teeth 5 each engage one recess 7 and the outer flanks 8 of the two adjacent teeth 5 at least partly locate on the arcuate surface of the respective recess 7. As shown in FIG. 2, the recess 7 radially runs out at its bottom with a radius r, thus producing an arcuate runout 9 to reduce load peaks during application of torque.

The arcuate serration 10, including arcuate recesses 7 rowed up on the inner surface of the bore 2 and provided with an arcuate runout 9 at the bottom (radiused arcuate internal edge), is producible with high dimensional accuracy in the brittle, hard material used here by plunge milling without surface damage or crack formation. The arcuate recesses can be milled in one or several passes of a single cutter or a plurality of cutters. The arcuate recesses can also be electrochemical machined or machined in other manners. Chipping, with the resultant negative consequences, will not occur. For the first time, thin-walled threaded inserts can be inserted in components made of brittle materials, such as titanium aluminide, with these inserts being safely retained in the arcuate serration and with adequate service-life being ensured.

If the number of teeth of the threaded insert is odd, one of the arcuate recesses is dimensioned such that it can accommodate three teeth. Basically, the arcuate recess 7 can also accommodate three or four adjacent teeth 5.

LIST OF REFERENCE NUMERALS

1 Casing, component
2 Bore in 1
3 Threaded insert
4 Serration of 3
5 Teeth of 4
6 Internal thread of 3
7 Arcuate recess
8 Outer flanks of 5
9 Arcuate runout of 7 (radiused edge)
10 Arcuate serration in 2

What is claimed is:

1. A system for attaching a threaded fastener to a component comprising:
 a threaded insert having an external serration including a plurality of externally projecting teeth distributed around a circumference of the threaded insert, the threaded insert also having a threaded portion,
 a component having a bore for receiving the threaded insert, the bore having an arcuate serration including at least one inwardly facing arcuate recess positioned on an internal circumference of the bore, the at least one arcuate recess having at least one of a different size and shape as compared to the teeth of the threaded insert and being positioned and sized to receive and engage at least two teeth of the external serration of the threaded insert to lock the threaded insert against rotation with respect to the component when the threaded insert is positioned in the bore and to allow a threaded fastener to be engaged with the threaded portion of the threaded insert to attach the threaded fastener to the component.

2. The system of claim 1, wherein the arcuate serration includes a plurality of inwardly facing arcuate recesses positioned around the internal circumference of the bore, with a plurality of the arcuate recesses each positioned and sized to receive and engage at least two teeth of the external serration of the threaded insert to lock the threaded insert against rotation with respect to the component, when the threaded insert is positioned in the bore.

3. The system of claim 2, wherein at least one arcuate recess is of a different size than other arcuate recesses to receive a remainder quantity of the teeth if a number of teeth of the external serration is not an integer multiple of a number of arcuate recesses.

4. The system in of claim 3, wherein an arcuate surface of each arcuate recess engages at least a portion of outer flanks of the teeth positioned within the respective arcuate recess.

5. The system of claim 4, wherein the arcuate recesses each include a radiused arcuate internal edge.

6. The system of claim 5, wherein the arcuate recesses extend only partially through the component to limit an axial movement of the threaded insert through the component.

7. The system of claim 1, wherein at least one arcuate recess is of a different size than other arcuate recess to receive a remainder quantity of the teeth if a number of teeth of the external serration is not an integer multiple of a number of arcuate recesses.

8. The system in of claim 7, wherein an arcuate surface of the arcuate recesses engages at least a portion of outer flanks of the teeth positioned within the respective arcuate recess.

9. The system of claim 8, wherein the arcuate recesses each include a radiused arcuate internal edge.

10. The system in of claim 1, wherein an arcuate surface of the arcuate recesses engages at least a portion of outer flanks of the teeth positioned within the respective arcuate recess.

11. The system of claim 1, wherein the arcuate recesses each include a radiused arcuate internal edge.

12. A method for locking a threaded insert against rotation, comprising:
providing a threaded insert with an external serration having a plurality of teeth,
forming an arcuate serration in a bore of a component, the arcuate serration having a plurality of arcuate recesses produced by at least one of plunge and circumferential surface milling, such that each of the arcuate recesses is constructed and arranged to receive at least two teeth of the external serration of the threaded insert to lock the threaded insert against rotation with respect to the component when positioned in the bore.

13. The method of claim 12, wherein each accurate recess is constructed and arranged to receive up to four teeth of the external serration.

14. The method of claim 13, wherein at least one arcuate recess is formed of a different size than other arcuate recesses to receive a remainder quantity of the teeth if a number of teeth of the external serration is not an integer multiple of a number of arcuate recesses.

15. The method of claim 14, wherein an arcuate surface of each arcuate recess is constructed and arranged to engage at least a portion of outer flanks of the teeth positioned within the respective arcuate recess.

16. The method of claim 15, wherein the arcuate recesses are each formed to include a radiused arcuate internal edge.

17. The method of claim 16, wherein the arcuate recesses are formed to extend only partially through the component to limit an axial movement of the threaded insert through the component.

18. The method of claim 12, wherein at least one arcuate recess is formed of a different size than other arcuate recesses to receive a remainder quantity of the teeth if a number of teeth of the external serration is not an integer multiple of a number of arcuate recesses.

19. The method of claim 18, wherein an arcuate surface of each arcuate recess is constructed and arranged to engage at least a portion of outer flanks of the teeth positioned within the respective arcuate recess.

20. The method of claim 19, wherein the arcuate recesses are each formed to include a radiused arcuate internal edge.

21. The method of claim 12, wherein an arcuate surface of each arcuate recess is constructed and arranged to engage at least a portion of outer flanks of the teeth positioned within the respective arcuate recess.

22. The method of claim 12, wherein the arcuate recesses are each formed to include a radiused arcuate internal edge.

* * * * *